No. 715,024. Patented Dec. 2, 1902.
J. C. CLANCY & L. W. MARSLAND.
EXTRACTING METALS FROM COMPLEX OR SULFID ORES.
(Application filed Mar. 2, 1901.)
(No Model.)
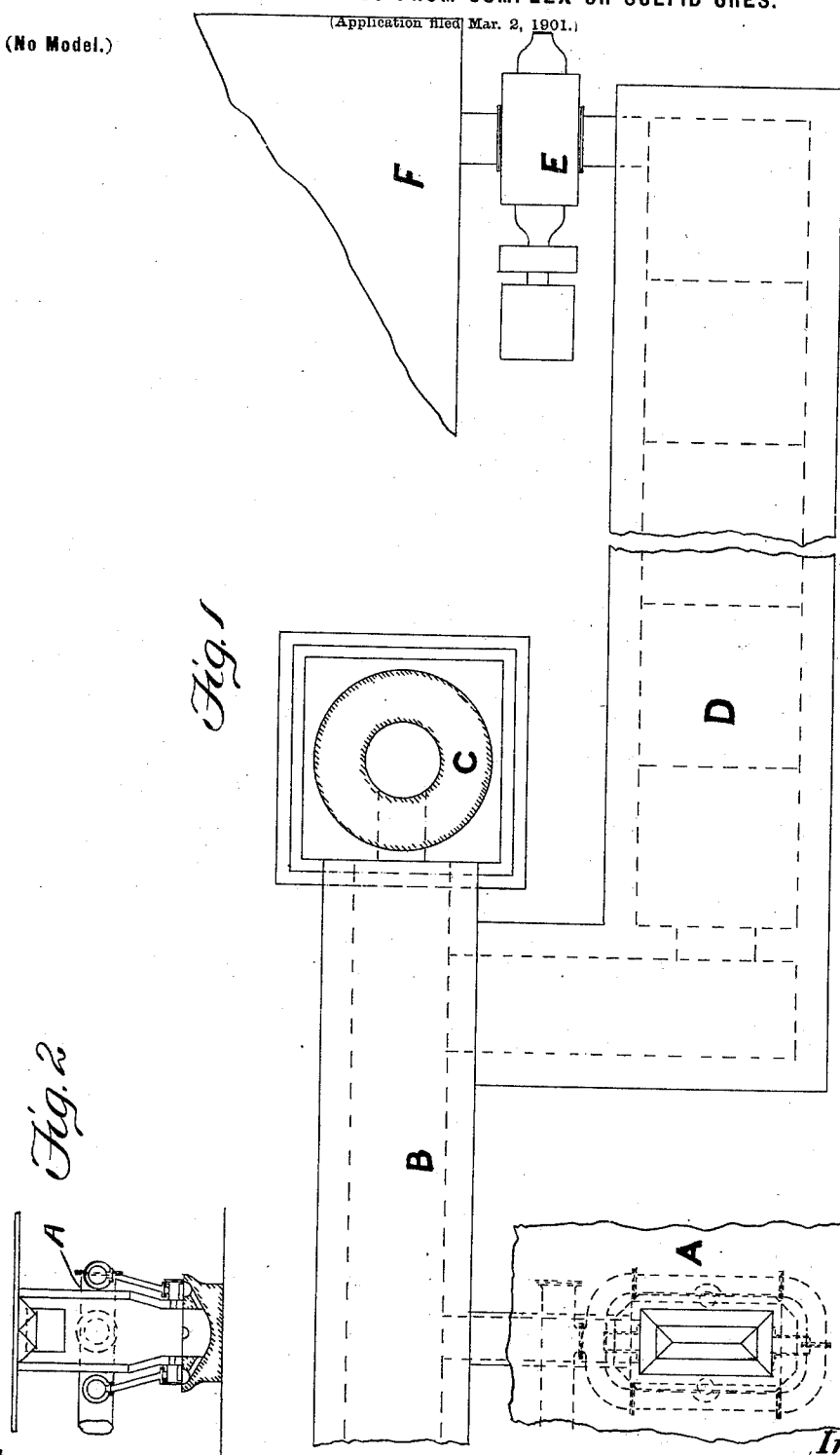
Witnesses
Percy Newell
Roy Newell
Inventors
JOHN C. CLANCY
LUKE W. MARSLAND
per Fred Walsh
Attorney

UNITED STATES PATENT OFFICE.

JOHN COLLINS CLANCY AND LUKE WAGSTAFF MARSLAND, OF SYDNEY, NEW SOUTH WALES, AUSTRALIA.

EXTRACTING METALS FROM COMPLEX OR SULFID ORES.

SPECIFICATION forming part of Letters Patent No. 715,024, dated December 2, 1902.

Application filed March 2, 1901. Serial No. 49,622. (No specimens.)

*To all whom it may concern:*

Be it known that we, JOHN COLLINS CLANCY, analytical chemist and metallurgist, and LUKE WAGSTAFF MARSLAND, solicitor, both of Mutual Life of New York Buildings, Martin Place, in the city of Sydney, State of New South Wales, in the Commonwealth of Australia, have invented Improvements in the Extraction of Gold, Silver, Lead, Zinc, and other Metals from Mixed or Complex Sulfid Ores, of which the following is a specification.

The object of our invention is to provide means whereby gold, silver, lead, zinc, and other metals may be extracted and recovered from mixed or complex sulfid ores (containing zinc, together with lead with or without other metals) economically and efficiently.

The mixed or complex sulfid ore to be treated either in the state in which it comes from the mine, or as concentrates, or in a disintegrated or a pulverized state, but preferably the latter, together with sulfate of lead in any quantity, but preferably in such quantity as is sufficient to react chemically upon the sulfid in atomic proportions, is charged into a furnace of any approved design.

A form of apparatus in which the process can be carried out is shown in the accompanying drawings, in which—

Figure 1 illustrates the apparatus in plan, and Fig. 2 a vertical sectional view of the furnace.

In the drawings, A is the furnace, which is similar to furnaces ordinarily employed in lead-smelting, but somewhat less in height, and is provided with a closed top of the well-known cap-and-cone arrangement. A series of these furnaces may be erected side by side and all connected with the common flue B, which leads to the chimney C or to the condensing-chamber D. The chimney C is for use in case of an emergency only and will usually be shut off from the flue B by suitable means. (Not shown in the diagrams.) The condensing-chamber D has a row of tanks covering its entire floor, (indicated by the dotted cross-lines,) and numerous jets (not shown) keep the chamber filled with fine sprays of water and dilute sulfuric acid, and the solutions produced are collected in the various tanks, which solutions are returned again and again to the chamber by means of the jets until the solutions collected at the end of the chamber nearest to the furnace is sufficiently concentrated for the extraction of its zinc sulfid by any convenient process.

E is an exhauster, by which the furnace-gases are caused to pass through the chamber D, and F is a building containing a gas-filtering plant if it should be found necessary to filter the furnace-gases before passing them into lead-chambers of the usual construction for the production of sulfuric acid.

The furnace is heated to such degree of temperature as will volatilize the lead and zinc, present in the ore, into fume. During this heating a reaction takes place between the lead sulfate and the sulfids, causing the evolution of sulfur dioxid and the conversion of the sulfids into oxids, and the lead sulfate into lead oxid, all or nearly all of the volatile metallic oxids being volatilized into fume. The lead sulfate reacts on the sulfids, producing sulfur dioxid and either metal or oxid, or both, in accordance with the following formulæ:

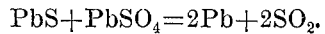
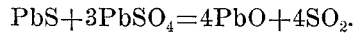
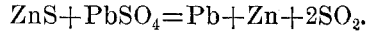
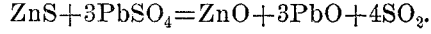

$$PbS + PbSO_4 = 2Pb + 2SO_2.$$
$$PbS + 3PbSO_4 = 4PbO + 4SO_2.$$
$$ZnS + PbSO_4 = Pb + Zn + 2SO_2.$$
$$ZnS + 3PbSO_4 = ZnO + 3PbO + 4SO_2.$$

After the sulfur dioxid has been given off the first portion of the treatment in the furnace is ended. We prefer to carry out the foregoing in a cupola or blast furnace, in which case while volatilizing the whole of the zinc it is sufficient to volatilize only such portion of the lead as will enable lead sulfate to be recovered in sufficient quantity to be added to a subsequent charge of ore to the furnace. The fume passes with the sulfur dioxid into a chamber called the "fume-chamber," in which dilute sulfuric acid is sprayed. The acid attacks the fume and forms lead sulfate and zinc sulfate or a sulfate corresponding to the oxid volatilized. The zinc sulfate in solution is drawn off from the chamber and treated by any of the usual methods for the separation of the zinc as zinc oxid and for the recovery of the sulfuric acid. The lead sulfate being insoluble is collected, dried, and smelted or may be used as the reagent for desulfurization of another charge of ore. Other soluble sulfates are recovered by known methods. The sulfurous-acid gas ($SO_2$) passes from the fume-chamber into a sulfuric-acid chamber similar to those commonly used in the manufacture of sulfuric acid and is there converted into sulfuric acid by known methods. The residue remaining in the furnace, (consisting chiefly of silica, alumina, iron, silver, and other metals present in the ore, together with some lead silicate,) is then smelted in the ordinary way, and the bullion is tapped off and recovered in the usual manner, as in ordinary blast-furnace smelting.

In practice we have found that the time necessary to effect the complete desulfurization of the ore is inversely proportional to the quantity of lead sulfate used—that is to say, the less lead sulfate is used the longer the time occupied in the reaction, (desulfurization,) and vice versa. When a blast-furnace is used for smelting sulfid ore direct, a greater quantity of lead sulfate may be added with advantage by reason of the less effective operation of the atmospheric oxygen, (air.) In practice we have found that an increase of about ten per cent. of lead sulfate will be sufficient to effect the required oxidation under these conditions.

Having now particularly described and ascertained the nature of our said invention and in what manner the same is to be performed, we declare that what we claim is—

1. In a process of extracting and recovering gold, silver, lead, zinc and other metals from mixed or complex sulfid ores consisting essentially in the following successive operations, heating the ore with the addition or admixture of lead sulfate in a cupola or blast-furnace so as to convert the required amount of lead and the whole of the zinc and other volatile metals contained in said mixture more or less wholly into fume, spraying dilute sulfuric acid upon the fume and gaseous products of decomposition to convert the fumed metallic oxids into their corresponding sulfates, recovering the lead sulfate used for mixing with the ore and the zinc and other volatile metals from the sulfates deposited in the first-named or fume chamber, recovering the metallic contents from the residue remaining in the furnace by smelting, all substantially as and for the purposes hereinbefore set forth.

2. A process of extracting metals from mixed or complex sulfid ores, consisting of adding to the sulfid ore to be treated lead sulfate obtained from a source external to the ore to be treated in a quantity proportionate to the atomic reacting weight of the lead sulfate upon the metallic sulfid, and then heating said mixture in a suitable furnace so as to convert the lead, zinc and other volatile metals into fumes.

3. A process of extracting metals from mixed or complex sulfid ores consisting of adding to the sulfid ore to be treated lead sulfate obtained from a source external to the ore, and then heating the mixture in a furnace so as to convert the required quantity of lead, zinc and other volatile metals into fumes.

In testimony whereof we have signed our names to this specification in the presence of two subscribing witnesses.

JOHN COLLINS CLANCY.
LUKE WAGSTAFF MARSLAND.

Witnesses:
 FRED WALSH,
 ELERY NEWELL.